(12) United States Patent
Tayal et al.

(10) Patent No.: US 11,533,677 B1
(45) Date of Patent: Dec. 20, 2022

(54) SYSTEM, METHOD, AND COMPUTER PROGRAM FOR PROACTIVE 5G LEG ESTIMATION

(71) Applicant: Amdocs Development Limited, Limassol (CY)

(72) Inventors: Sagar Tayal, Ambala (IN); Manish Kumar Singh, Kolkata (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 17/087,475

(22) Filed: Nov. 2, 2020

(51) Int. Cl.
   *H04W 48/16* (2009.01)
   *H04W 48/08* (2009.01)

(52) U.S. Cl.
   CPC .......... *H04W 48/16* (2013.01); *H04W 48/08* (2013.01)

(58) Field of Classification Search
   CPC ............... H04W 36/14; H04W 84/042; H04W 12/041
   USPC .......................................... 455/434
   See application file for complete search history.

(56) References Cited

U.S. PATENT DOCUMENTS

| | | | |
|---|---|---|---|
| 10,499,323 B2 | 12/2019 | Kwok | |
| 2018/0368016 A1 | 12/2018 | Lee et al. | |
| 2018/0376446 A1* | 12/2018 | Youn | H04W 8/20 |
| 2019/0009205 A1 | 1/2019 | Oberli et al. | |
| 2019/0053136 A1 | 2/2019 | Lee et al. | |
| 2019/0268833 A1* | 8/2019 | Kwok | H04W 16/14 |
| 2020/0267605 A1* | 8/2020 | Bae | H04B 1/401 |
| 2021/0105670 A1* | 4/2021 | Chiang | H04W 60/005 |
| 2021/0136859 A1* | 5/2021 | Yoo | H04W 76/27 |
| 2022/0053426 A1* | 2/2022 | Ahn | H04W 76/16 |

FOREIGN PATENT DOCUMENTS

CN          111246543 A     6/2020

* cited by examiner

*Primary Examiner* — Fabricio R Murillo Garcia
(74) *Attorney, Agent, or Firm* — Zilka-Kotab, P.C.

(57) ABSTRACT

As described herein, a system, method, and computer program are provided for proactive 5G leg estimation. During an initial access procedure by a user equipment on a 4G leg of a 4G-LTE network, an eNodeB of the 4G-LTE network computes a parameter for the user equipment. Further, the eNodeB of the 4G-LTE network conditionally allows an addition of a 5G leg to the 4G-LTE network for the user equipment, based on the parameter computed for the user equipment.

6 Claims, 18 Drawing Sheets

100

102 — during an initial access procedure by a user equipment on a 4G leg of a 4G-LTE network, computing a parameter for the user equipment 104 — conditionally allowing an addition of a 5G leg to the 4G-LTE network for the user equipment, based on the parameter computed for the user equipment Option 3X – Control Plane -LTE and User Plane-5G , Core- LTE

SYSTEM, METHOD, AND COMPUTER PROGRAM FOR PROACTIVE 5G LEG ESTIMATION

FIELD OF THE INVENTION

The present invention relates to 5G support in a 4G-LTE infrastructure.

BACKGROUND

Currently, fifth generation (5G) can be supported in existing fourth generation long-term evolution (4G-LTE) infrastructure. In particular, Non-Stand Alone (NSA) architecture can be deployed at the Radio Access Network (RAN) end which allows 5G RAN networks to be supported by existing 4G RAN and 4G core networks. The perceived class of experience for consumers depends on the standardized algorithms applied which smartly facilitate the cofunction of 4G-LTE and 5G networks. However, dynamic network behavior should still be kept in consideration. Conditions which should be considered include network coverage, link management, device battery management, device user interface (UI), and network capacity, so that the device and network can synchronize to have reduced signaling, fewer network failures and better user experience. There is thus a need for addressing these and/or other issues associated with the prior art.

SUMMARY

As described herein, a system, method, and computer program are provided for proactive 5G leg estimation. During an initial access procedure by a user equipment on a 4G leg of a 4G-LTE network, an eNodeB of the 4G-LTE network computes a parameter for the user equipment. Further, the eNodeB of the 4G-LTE network conditionally allows an addition of a 5G leg to the 4G-LTE network for the user equipment, based on the parameter computed for the user equipment.

DETAILED DESCRIPTION

Figure 1:
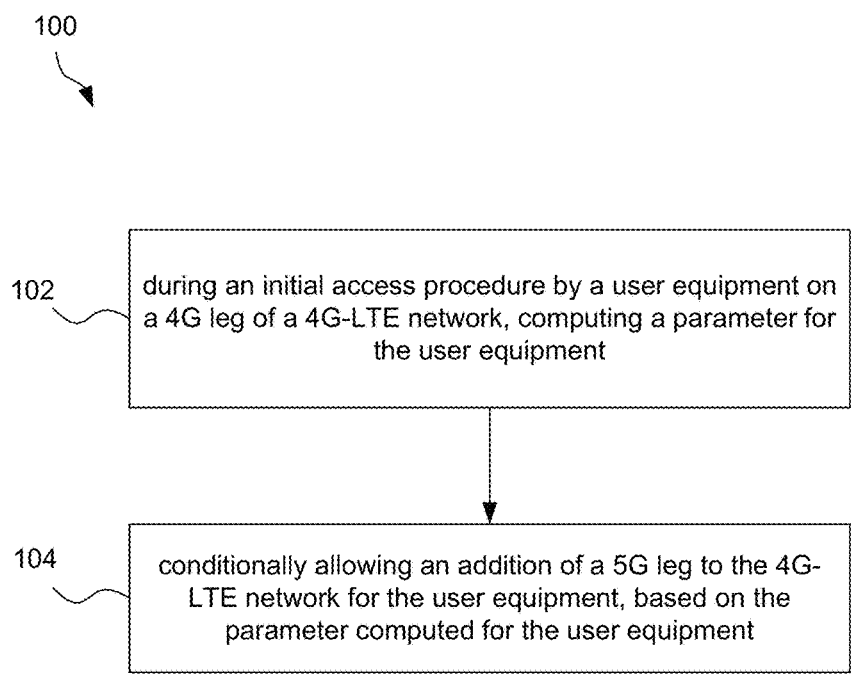
FIG. 1 illustrates a method for proactive 5G leg estimation, in accordance with one embodiment.

FIG. 1 illustrates a method 100 for proactive 5G leg estimation, in accordance with one embodiment. In the context of the present embodiment, the method 100 is performed by an eNodeB of a 4G-LTE network. The eNodeB is located in a particular 4G leg of the 4G-LTE network.

The proactive 5G leg estimation may be used for determining a feasibility of adding the 5G leg to the 4G-LTE network for a particular user equipment that is equipped to support 5G, such that the method 100 is performed prior to actually adding the 5G leg to the 4G-LTE network. The 4G leg and the 5G leg may optionally be intended to be collocated, or alternatively intended to be located in separate cells of the 4G-LTE network.

As shown in operation 102, during an initial access procedure by a user equipment on a 4G leg of the 4G-LTE network, a parameter is computed for the user equipment. With respect to the present description, the user equipment is configured to support 5G (i.e. to allow communications over a 5G network). The user equipment may be a mobile phone, for example, or any other user device configured to support 5G.

The initial access procedure may also be referred to as a RACH procedure (i.e. process) by which the user equipment attaches to the 4G leg of the 4G-LTE network. The parameter may be computed (e.g. measured) based on information obtained from the user equipment during the initial access procedure. In various embodiments, the parameter may be a timing advance computed for the user equipment, a cell distance computed for the user equipment, an existing power level computed for the user equipment, and/or an effective downlink coverage computed for the user equipment.

Further, as shown in operation 104, an addition of the 5G leg to the 4G-LTE network is conditionally allowed for the user equipment, based on the parameter computed for the user equipment. In other words, the 5G leg to the 4G-LTE network may be allowed to be added when the parameter makes use of the 5G leg by the user equipment feasible (i.e. when the parameter does not hinder or prevent use of the 5G leg by the user equipment).

In one embodiment, it may be verified whether the parameter is allowed for the 5G network. The verification may be based on a policy defined for the 5G leg. For example, where the parameter is the advanced timing for the user equipment, it may be verified whether the advanced timing is allowed for the 5G network. As another example, where the parameter is the existing power level computed for the user equipment, it may be verified whether the existing power level will support an uplink synchronization with the 5G leg.

To this end, conditionally allowing the addition of the 5G leg to the 4G-LTE network for the user equipment may include allowing the addition of the 5G leg to the 4G-LTE network for the user equipment when the parameter is verified as being allowed for the 5G leg. In this case, when the 5G leg is added to the 4G-LTE network, the user equipment may be caused to perform an initial access (RACH) procedure on the 5G leg added to the 4G-LTE network.

On the other hand, conditionally allowing the addition of the 5G leg to the 4G-LTE network for the user equipment may include preventing the addition of the 5G leg to the 4G-LTE network for the user equipment when the parameter is verified as not being allowed for the 5G leg. In this case, when the 5G leg is prevented from being added to the 4G-LTE network, the user equipment may be notified that the 5G leg is not added to the 4G-LTE network. Thus, the user equipment will not perform the initial access procedure.

By proactively making a 5G estimation (i.e. the feasibility of the 5G leg for the user equipment), as described in the method 100 above, the 5G leg may only be added to the 4G network when use of such 5G leg is feasible for the user equipment. When a parameter of the user equipment would prevent use of the 5G leg, such as when a cell range or battery power level would prevent an uplink synchronization with the 5G leg, then the 5G leg may not be added. Preventing the unusable 5G leg from being added will in turn reduce signaling otherwise required for the user equipment to try and connect to the 5G leg, may result in fewer network failures (i.e. a failure of the user equipment to connect to the 5G leg, and may result in an improved user experience on the user equipment.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2A:
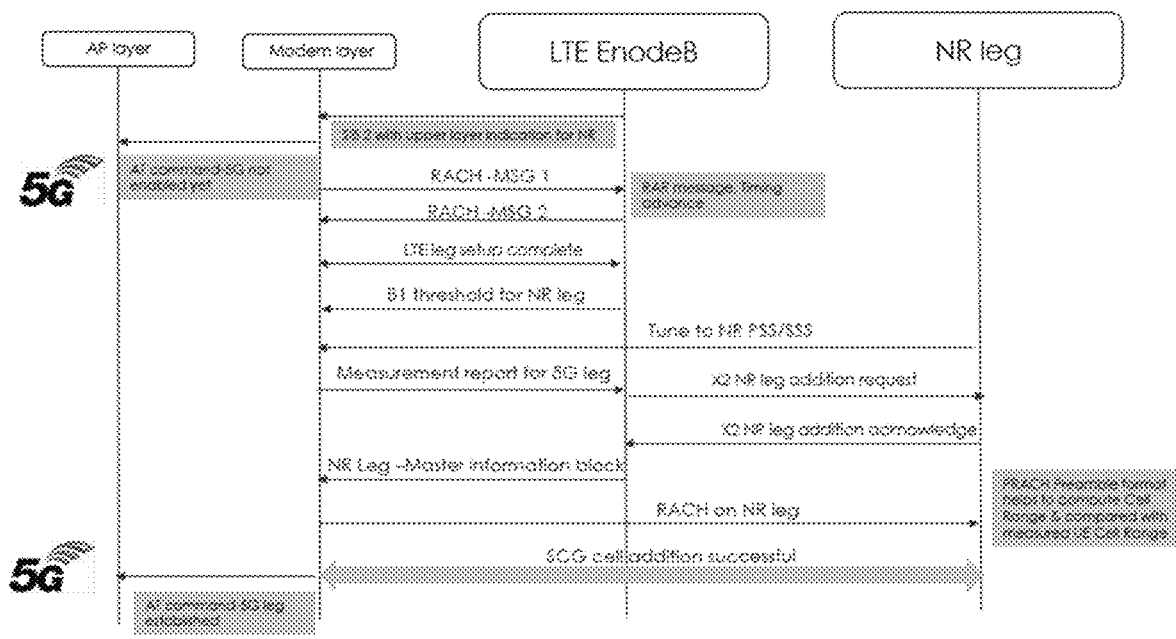
FIGS. 2A-B illustrate communication flow diagrams for addition of a 5G leg in a 4G network, in accordance with the prior art.

In a traditional (prior art) NSA call flow, as shown in the communication flow diagram of FIG. 2A, if a user equipment attaches to the network then there are existing algorithms specified by the Standard bodies in which user equipment attaches to the 4G LTE RAN and Core, upon which 5G new radio (NR) leg is added depending on 5G radio coverage preconfigured in the connection management data. In a 4G LTE network, a cell broadcasts a system information block 2 (SIB2) including a public land mobile network (PLMN)-InfoList-r15 if there is 5G coverage or NR capability in the 4G LTE cell area. The SIB2 upperLayerindication notifies upper layers that a user equipment has entered a coverage area that offers 5G capabilities. The Stand Alone supported Cell site broadcasts the SIB2 (System information block). As per the user equipment, a NSA evolved-universal terrestrial radio access network (E-UTRAN) NR-dual connectivity (DC) (NSA EN-DC) user equipment shall display a "5G" technology indicator when the NSA EN-DC UE is in a 4G LTE cell, such as either a camped cell in a radio resource control (RRC) idle state, or an LTE PCell in an RRC connected state, which in an SIB2 includes the PLMN-InfoList-r15 information element (IE) (upperlayerindication-r15) set as TRUE. The user equipment end modem, upon receiving the Upper layer indication, sends the attention (AT) command to application protocol (AP) layer to display the "5G" Symbol on user equipment display.

After this, the user equipment and network perform protocol transactions and the user equipment gets connected to the LTE RAN and Evolved Packet Core (EPC) network. In case the user equipment supports 5G, then the LTE eNodeB provides the NR-Absolute Radio-Frequency Channel Number (ARFCN) which the user equipment can measure with the help of RRC messages. In case the user equipment finds the signal quality beyond a certain threshold (defined as B1) it will notify the LTE eNodeB and then the LTE eNodeB communicates with the 5G-NR gNodeB (gNB) to assign resources for a 5G bearer in the X2 signaling. The 5G-NR resource assignment is then signaled to the user equipment via an LTE RRC Connection Reconfiguration message. Once the RRC Connection Reconfiguration procedure is completed, the user equipment achieves the downlink synchronization by checking Primary Synchronization Signal (PSS), Secondary Synchronization Signal (SSS) and Broadcast signals. After this the user equipment performs Uplink Synchronization (UL Sync) by sending a random access preamble, and the NR-NodeB measures the cell range with the help of the preamble format. In case it is in an allowable range, then the UL Sync is performed and data flow is then allowed with the 5G leg as well.

However, the traditional NSA call flow described above is associated with various problems. First, the user equipment displays the "5G" symbol on user interface even before the 5G (NR) leg is added. In case 5G leg fails, the user of the user equipment still has the perception that user equipment is connected to the 5G network. In other words, the LTE leg SIB2 is the sole condition for the user equipment to display the "5G" symbol on user interface.

Figure 2B:
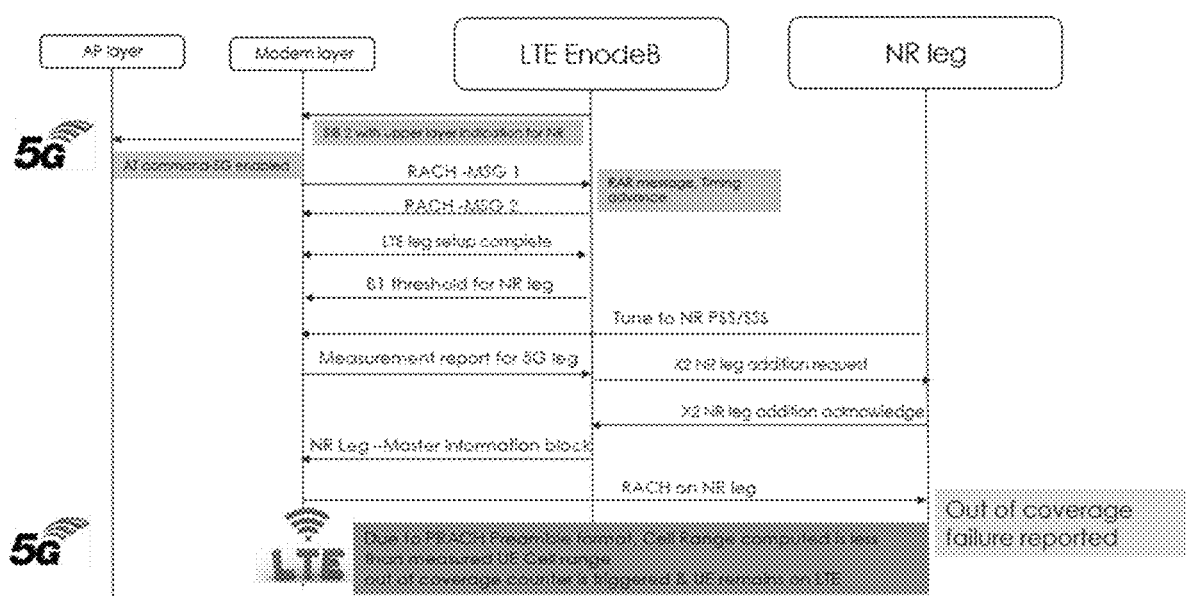

Second, even though an Uplink Synchronization issue can happen on the 5G leg, the 5G leg is still attempted to be added in the traditional call flow scenario. However, the user equipment can be Uplink limited due to a Cell Range configuration or Battery limitation, and still the user equipment would attempt the 5G connection process. This prior art issue is shown in the communication flow diagram of FIG. 2B. Current mechanisms are proactively not utilizing the Geographical based data & connection management data from 4G LTE leg beforehand to get insights about 5G leg addition feasibility. The whole failure procedure leads to a lot of steps which would eventually lead to signaling, thus causing expensive spectrum resources wastage on RAN, X2 Link Congestion and user equipment battery consumption due to excessive signaling with the 4G LTE eNodeB and the 5G leg.

FIG. 3 illustrates a method 300 for proactive 5G leg estimation by an eNodeB in a 4G leg when the 5G leg is collocated with the 4G leg, in accordance with one embodiment. The method 300 may be implemented in the context of the method 100 of FIG. 1. Thus, the above descriptions may equally apply to the present embodiment.

In the present embodiment, during the LTE RACH process with the user equipment, a timing advance is computed for the user equipment at the LTE eNodeB in a cell of the 4G LTE network (see operation 302). As the 4G LTE and 5G legs can be collocated (i.e. co-located or located in the same cell and/or have the same coverage), this timing advance computation can be used to check the maximum 5G leg timing advance allowed from the connection management data (see operation 304). If the timing advance is not allowed from 5G, then the eNodeB doesn't allow the X2 addition for this Physical Cell Identity (PCI) (see operation 310), which may be accomplished by adding the offset (QNRoffs) to the reporting entity in the RRC message which the eNodeB instructs to the user equipment for the 5G leg addition.

Table 1 illustrates an example of the RRC message in accordance with the present embodiment.

TABLE 1

RRC message:
    Addition--QNRoffs for PCI X
    New Device Measurement report →
    NR leg measurement for PCI X + QNRoffs If the timing advance is allowed from 5G, then the 5G leg is allowed to be added to the cell of the 4G-LTE network (see operation 306) and the user equipment is caused to perform the initial access procedure on the added 5G leg (see operation 308).

After the LTE leg addition, the eNodeB would continuously monitor the user equipment timing advance. The eNodeB measures the required timing advance based on the received user equipment signal arrival time. It commands the user equipment to adjust the transmission time. It is signaled by means of a special media access control (MAC) control element (Logical Channel Identifier (LCID)) and then it can instruct the user equipment in case it is allowed. When the timing advance is in the allowable range, then Qoffset is removed and the user equipment can add that collocated PCI 5G leg as per downlink coverage.

Figure 3A:
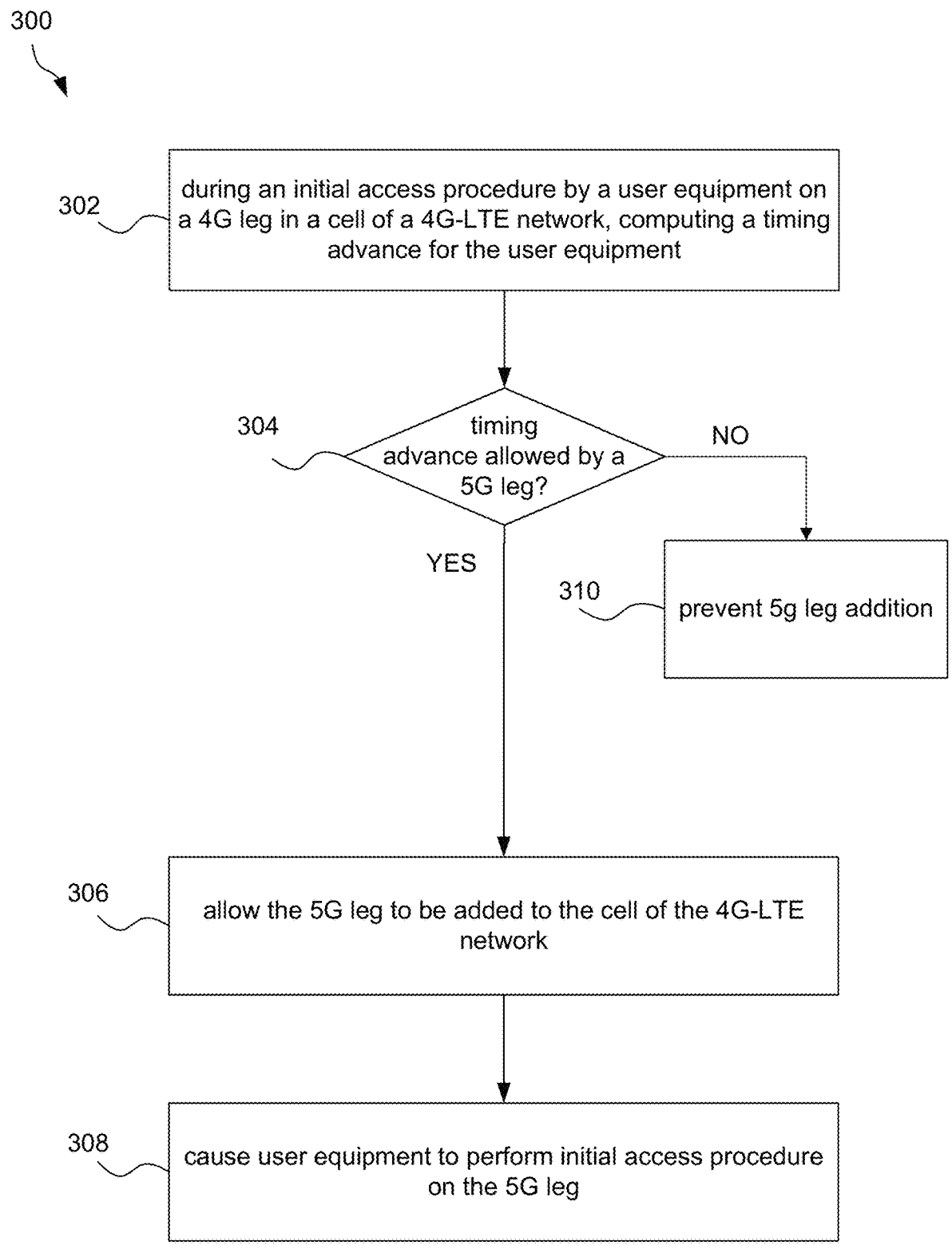
FIG. 3A illustrates a method for proactive 5G leg estimation by an eNodeB in a 4G leg when the 5G leg is collocated with the 4G leg, in accordance with one embodiment.
Figure 3B:
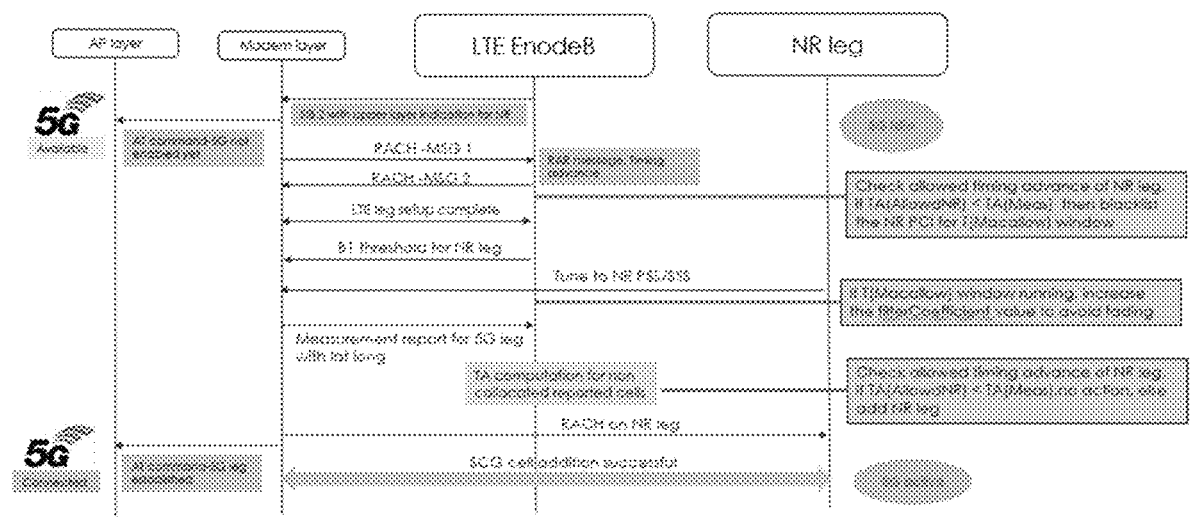
FIGS. 3B-D illustrate exemplary communication flow diagrams for the method of FIG. 3A, in accordance with various embodiments.

FIG. 3B illustrates a communication flow diagram for the method 300 of FIG. 3.

In between wherever there is an abnormal scenario, the user equipment will switch the displayed icon to "LTE Only."

Figure 3C:
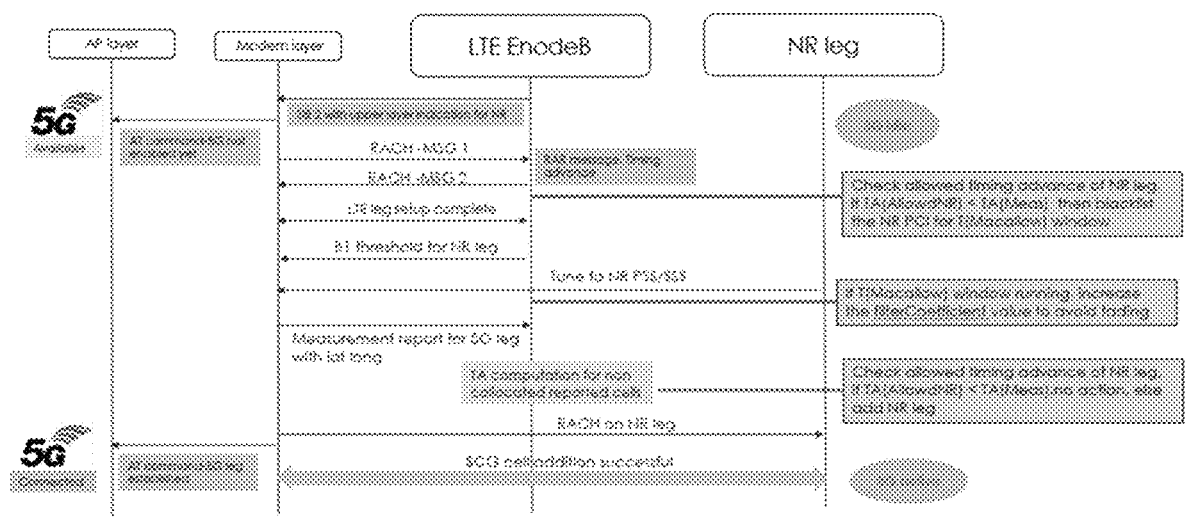

FIG. 3C illustrates an exemplary communication flow diagram for a transition to "LTE Only."

Figure 3D:
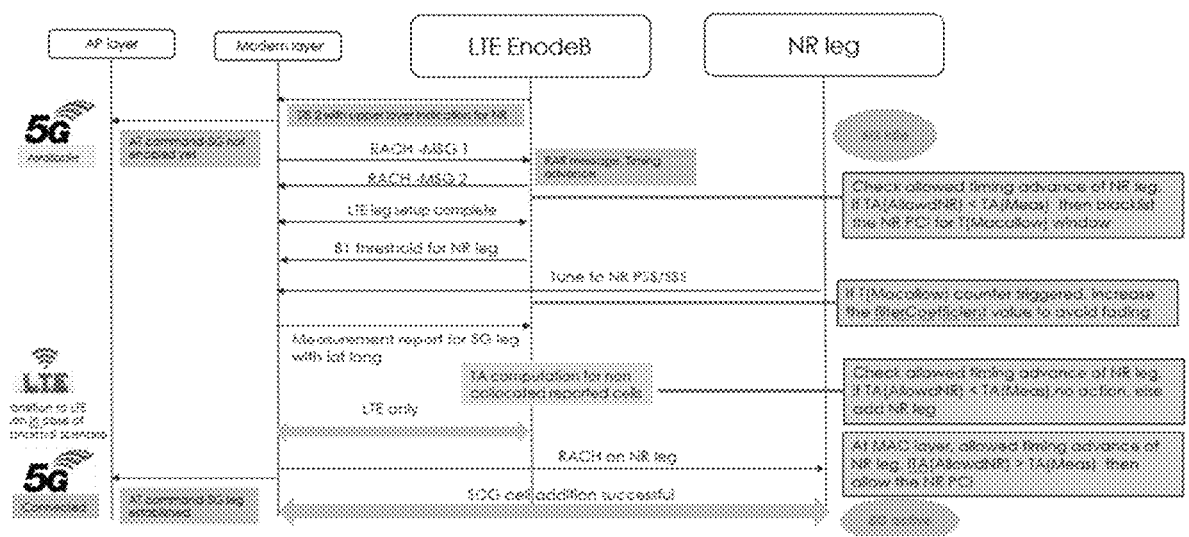

FIG. 3D illustrates an exemplary communication flow diagram for an intermediate transition to "LTE Only."

The embodiments described above proactively saves the signaling and saves lot of resources. While the above described embodiments are associated with the Cell Range, similar embodiments can be prepared around device power and/or effective downlink coverage.

Figure 4:
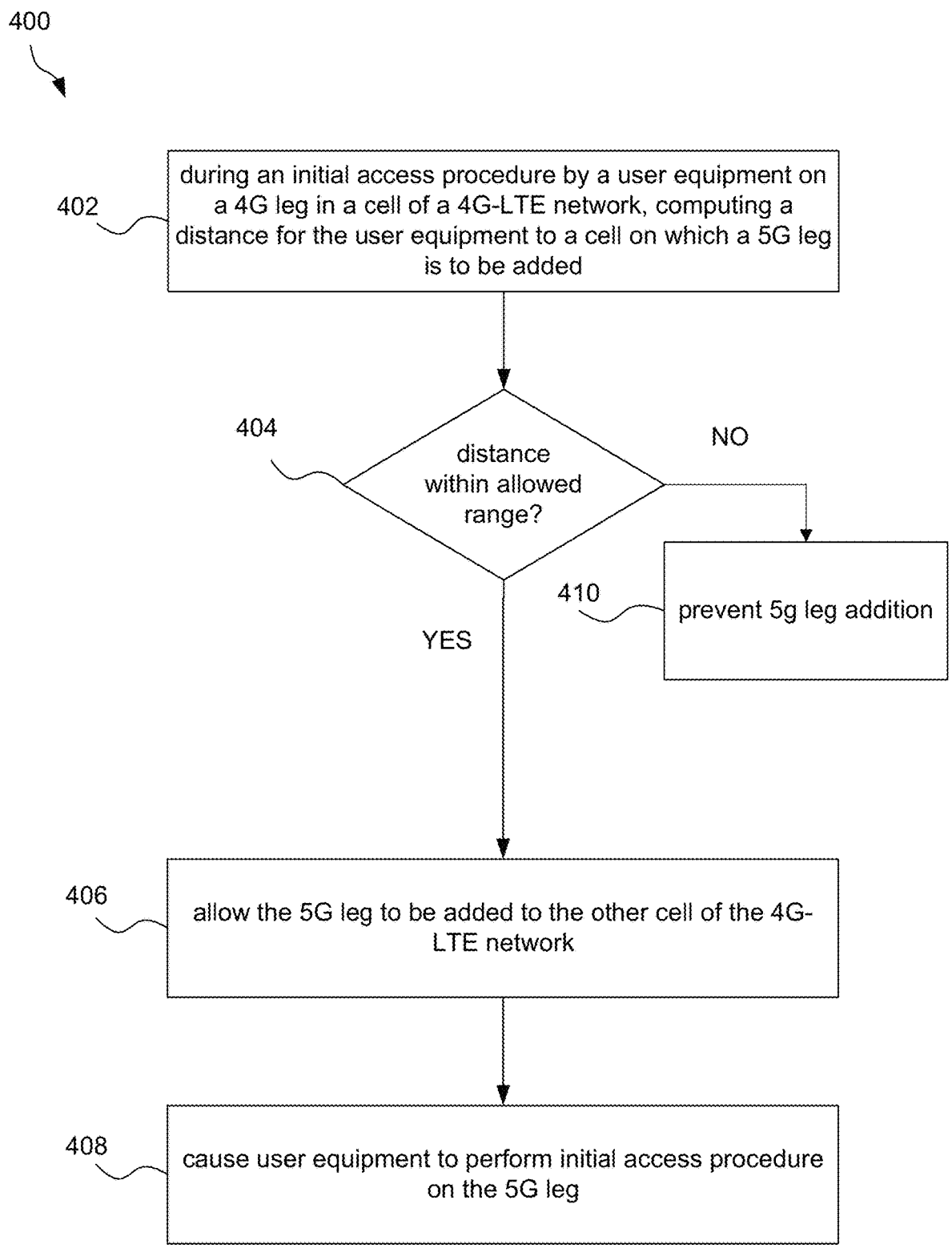
FIG. 4 illustrates a method for proactive 5G leg estimation by an eNodeB in a 4G leg when the 5G leg is not collocated with the 4G leg, in accordance with one embodiment.

FIG. 4 illustrates a method 400 for proactive 5G leg estimation by an eNodeB in a 4G leg when the 5G leg is not collocated with the 4G leg, in accordance with one embodiment. The method 400 may be implemented in the context of the method 100 of FIG. 1. Thus, the above descriptions may equally apply to the present embodiment.

There can be the case in which LTE and 5G legs are not collocated but the user equipment may require to add the 5G leg located with another LTE cell due to a different spectrum range or configuration. In that case, the eNodeB checks the geolocation data computation. As shown, during an initial access procedure by the user equipment on the 4G leg in a cell of a 4G-LTE network, a distance for the user equipment to a cell on which a 5G leg is to be added is computed (see operation 402).

As the Minimization of Drive Test (MDT) devices report the Latitude/Longitudes along with the PCI on a measurement report, the eNodeB needs to compute the displacement between the device Latitude/Longitudes and the 5G leg Latitude/Longitudes (from site database fed in connection management data) to determine whether the user equipment distance is within the allowed range (see operation 404).

In case the distance is within the allowed range, then no Qoffset is required and the 5G leg is allowed to be added to the other cell (see operation 406). The user equipment is caused to perform the initial access procedure on the added 5G leg (see operation 408). In case the distance is beyond the allowed range, then Qoffset is added so that 5G leg is not added (see operation 410). This whole solution proactively saves the signaling and saves a lot of resources. While the above solution is around the Cell Range, a similar solution can be prepared around device power and/or effective downlink coverage.

Figure 5A:
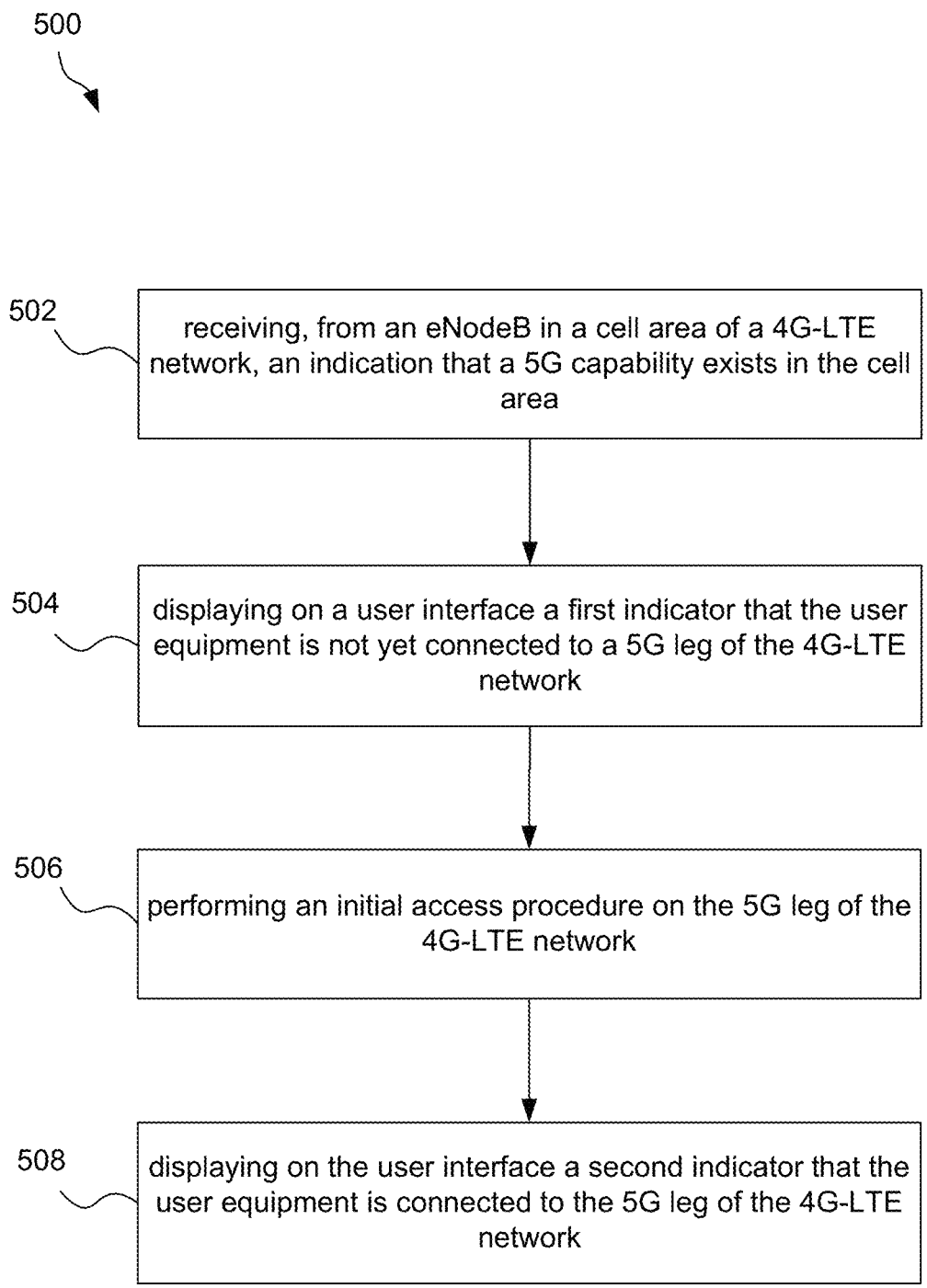
FIG. 5A illustrates a method for providing a 5G indicator on a user interface of user equipment, in accordance with one embodiment.

FIG. 5A illustrates a method 500 for providing a 5G indicator on a user interface of user equipment, in accordance with one embodiment. The method 500 may be performed by the user equipment and may be implemented in the context of any of the previous Figures described above, as an option. Thus, the above descriptions may equally apply to the present embodiment.

In operation 502, an indication that a 5G capability exists in a cell area of a 4G-LTE network is received from an eNodeB in the cell area. In operation 504, a first indicator that the user equipment is not yet connected to a 5G leg of the 4G-LTE network is displayed on a user interface. Thus, upon receiving the upper layer indication from SIB2 on user equipment modem layer, the user equipment would send an AT command to the AP layer with the command that "5G is not enabled yet" and that a "5G Idle" indicator or other like indicator is to be displayed. The modem layer checking the PLMN signals the application layer that the user interface should show "5G Idle" or something similar.

In operation 506, an initial access procedure is performed on the 5G leg of the 4G-LTE network. In operation 508, a second indicator that the user equipment is connected to the 5G leg of the 4G-LTE network is displayed on the user interface. The second indicator, such as "5G Active," may thus be displayed responsive to receiving a message (message 2) from the 5G leg of the 4G-LTE network.

Figure 5B:
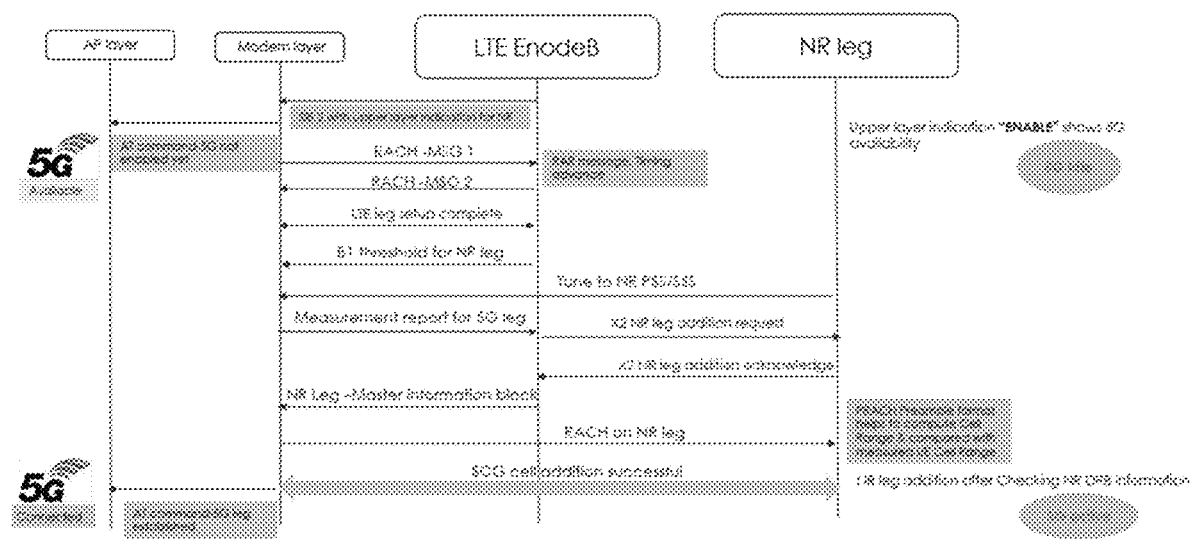
FIG. 5B illustrates a communication flow diagram of the method of FIG. 5A.

FIG. 5B illustrates a communication flow diagram of the method 500 of FIG. 5A.

Figure 5C:
FIG. 5C illustrates indicators that may be displayed on the user equipment in accordance with the communication flow diagram of FIG. 5B.

FIG. 5C illustrates indicators that may be displayed on the user equipment in accordance with the communication flow diagram of FIG. 5B.

Glossary

1. NSA Architecture and Deployment Option 3x

NSA stands for Non-Stand-Alone Access, where the control plane uses the legacy LTE Network and the user plan is on 5G and use LTE legacy Core for connectivity. The feature which enables this is also called EN-DC, which stands for Eutra-Network dual connectivity. Using EN-DC Features enabled on both LTE and 5G Nodes UE can download data using both LTE and NR leg or LTE Leg or NR leg.

Table 2 illustrates deployment option 3x among a plurality of different deployment options.

TABLE 2

| Deployment Option | Core Network | Master RAT | Secondary RAT | 3gpp Term |
| --- | --- | --- | --- | --- |
| Option 1 | EPC | LTE | — | LTE |
| Option 2 | 5GC | 5GNR | — | 5GNR |
| Option 3 | EPC | LTE | 5GNR | ENDC |
| Option 3a | EPC | LTE | 5GNR | ENDC |
| Option 3x | EPC | LTE | 5GNR | ENDC |
| Option 4 | 5GC | 5GNR | eLTE | NE-DC |

TABLE 2-continued

| Deployment Option | Core Network | Master RAT | Secondary RAT | 3gpp Term |
|---|---|---|---|---|
| Option 5 | 5GC | eLTE | — | eLTE |
| Option 7 | 5GC | LTE | 5GNR | NGENDC |

Figure 6:
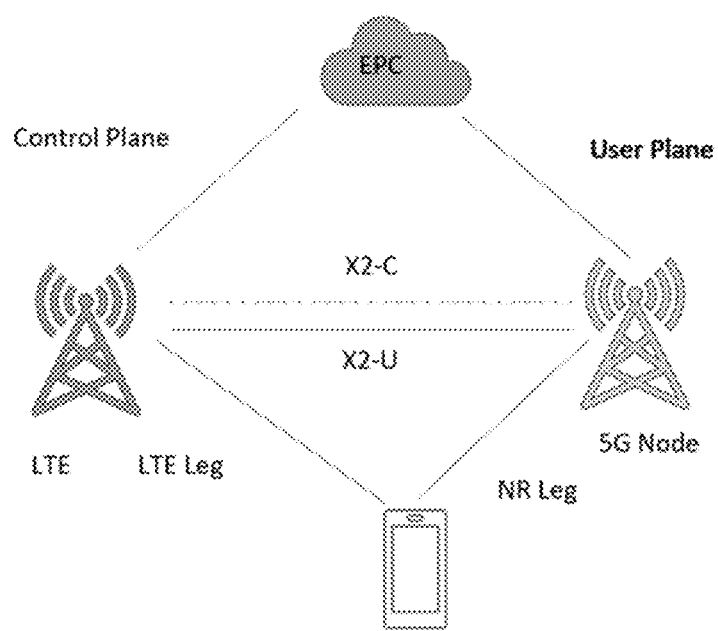
FIG. 6 illustrates a system diagram for deployment option 3x, in accordance with an embodiment.

FIG. 6 illustrates a system diagram for deployment option 3x, in accordance with an embodiment.

2. eNB and gNB(Baseband Nodes LTE & NR):

E-UTRAN Node B, also known as Evolved Node B (abbreviated as eNodeB or eNB), is the element in E-UTRA of LTE that is the evolution of the element Node B in UTRA of UMTS. It is the hardware that is connected to the mobile phone network that communicates directly wirelessly with mobile handsets (UEs), like a base transceiver station (BTS) in GSM networks. NodeB in 5G is called GnodeB, This Nodes creates the LTE service coverage area and responsible for connecting devices to the core Network.

In NSA Mode EnodeB is connected to the 5G Baseband which is called the gNoddB over the X2 Interface and helps UE to uses EN-DC mode provides feature is enabled on the both the nodes.

eNB and gNB uses the E-UTRA protocols OFDMA (downlink) and SC-FDMA (uplink) on its LTE-Uu interface.

Figure 7:
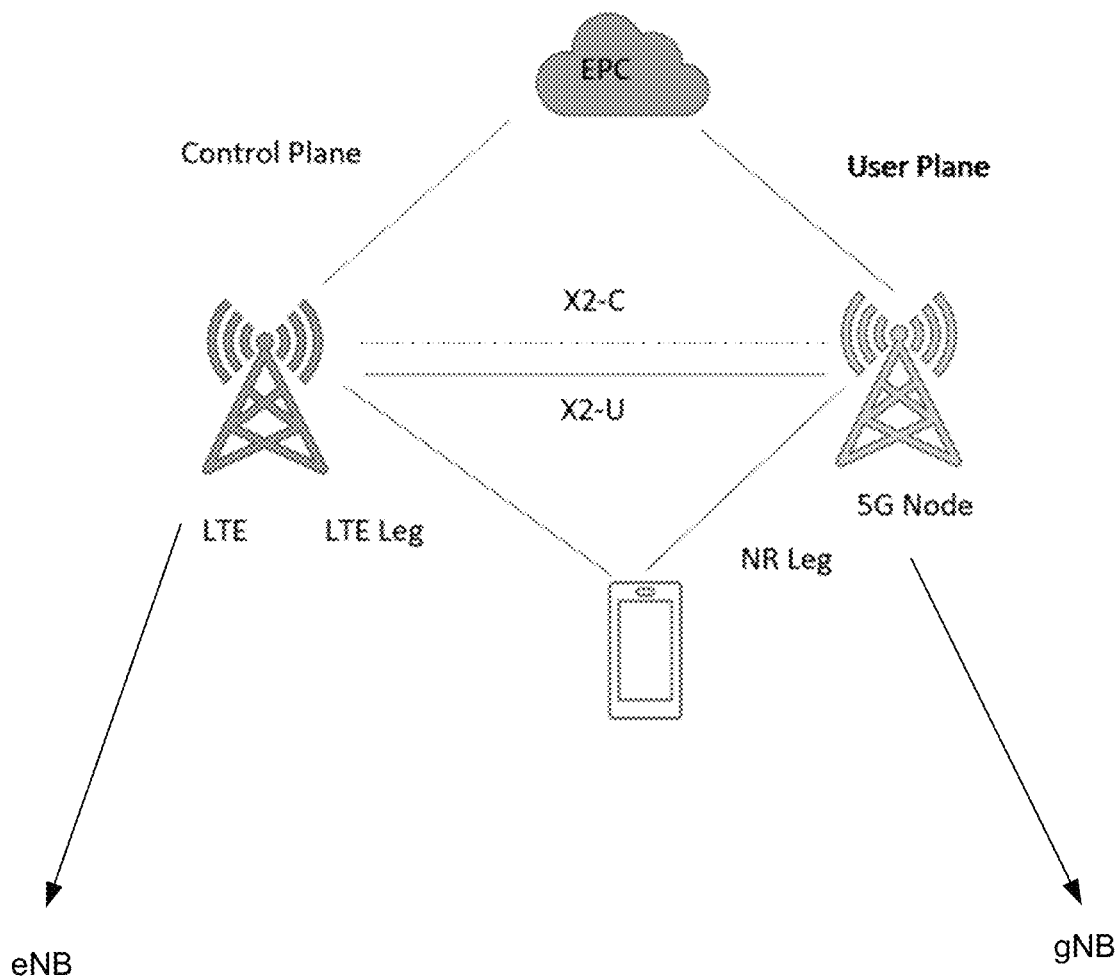
FIG. 7 illustrates a system diagram for a network with an eNB and a gNB, in accordance with an embodiment.

FIG. 7 illustrates a system diagram for a network with an eNB and a gNB.

3. RACH Process

Initial Access means a sequence of process between UE and gNB (Network) in order for UE to acquire Uplink Synchronization and obtain specified ID for the radio access communication. In more familiar terms, this Initial Access is referred to be 'RACH process'.

RACH is used primarily for: Change state from idle to connected; Handovers; Uplink synchronization; Change state inactive to connected.

Figure 8:
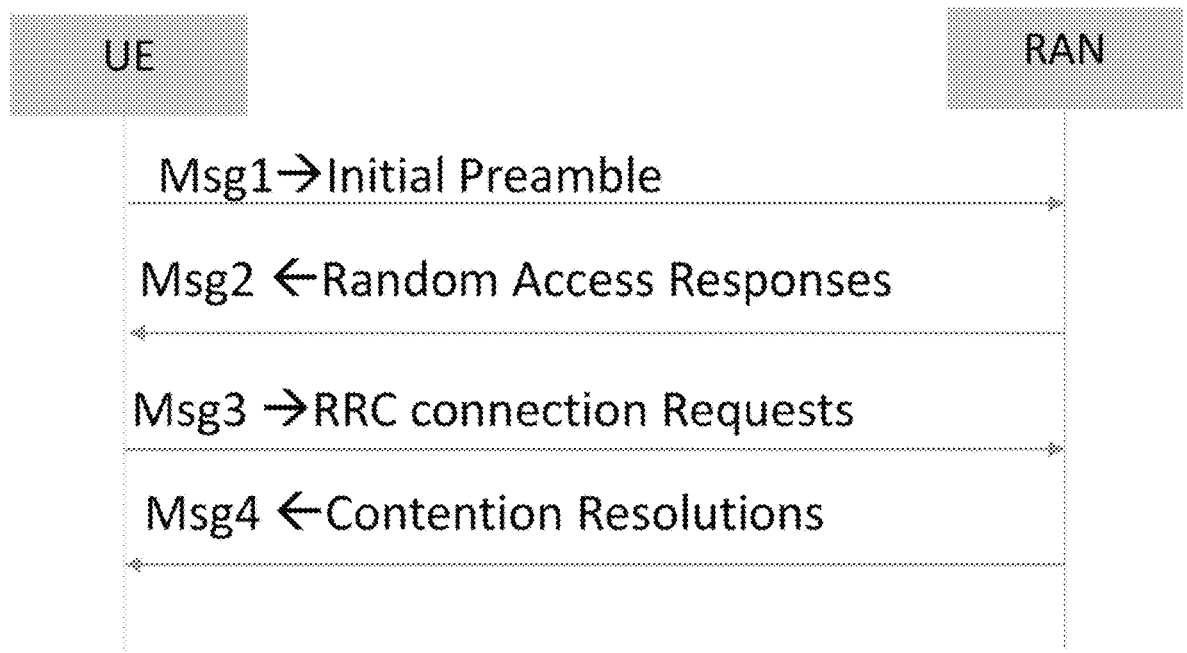
FIG. 8 illustrates RACH steps for Initial Access, in accordance with an embodiment.

RACH Steps for Initial Access, as shown in FIG. 8:

Msg 1 (select a preamble and select resource on the resource grid and Transmit RACH).

Msg 2 (RAR—Random Access Response which is gNB/eNB acknowledge the msg1 and assign resource for msg3 and provide the Timing Advance command to UE for sync, Please note in case the TA calculate at eNB/gNB is outside the range configured, Msg1 is rejected saying UE is out of coverage area of the eNB.

Msg3 (RRC Connection Request, Post Msg2 success the UE send a RRC connection request based on the resource that is assigned by the eNB/gNB.

Msg4 (Contention Resolution, Post Msg3, CT timer is started and UE starts monitoring PDCCH, if it is successfully decodes the PDCCH, CT time is stopped and RACH Process is successful.)

4. Timing Advance

Figure 9:
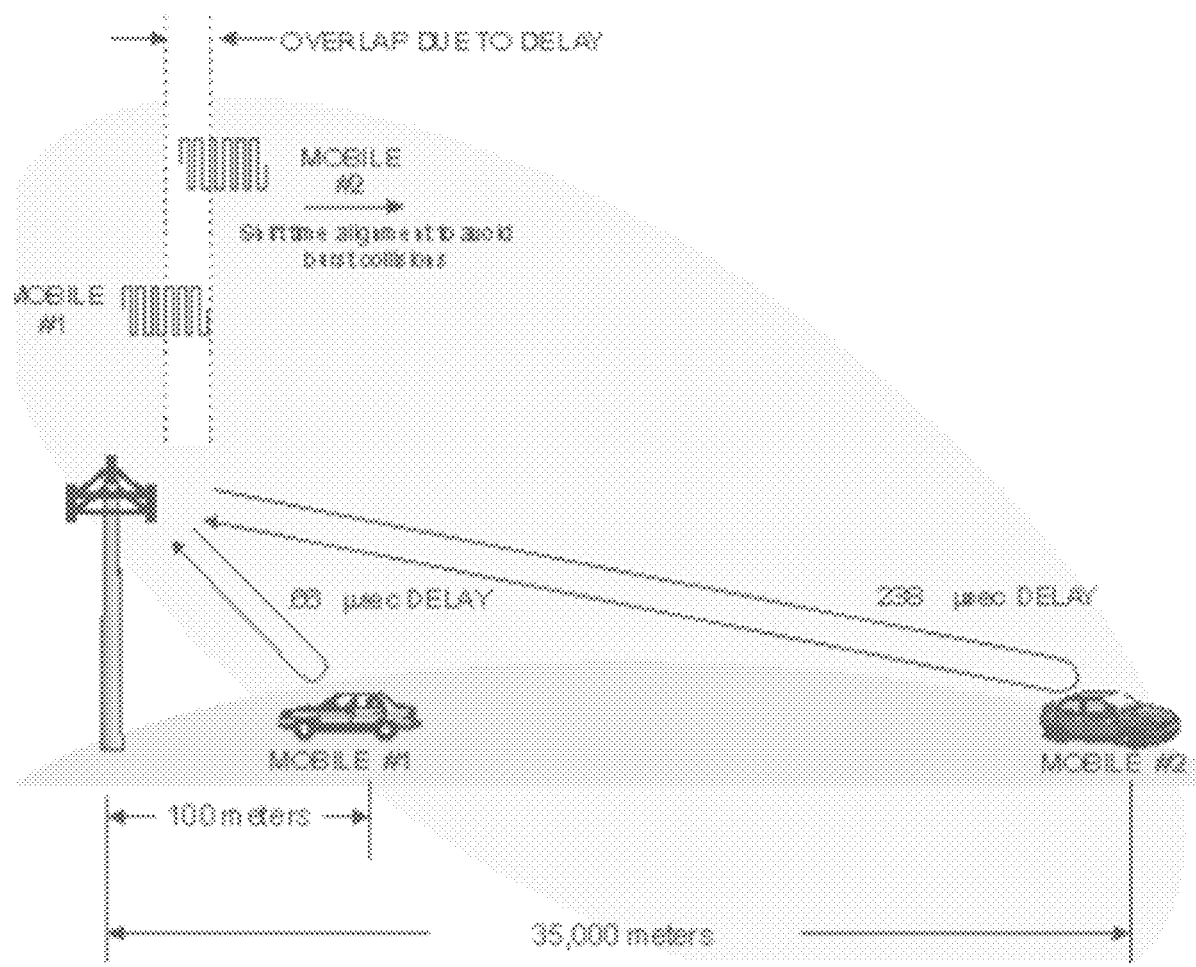
FIG. 9 illustrates an exemplary timing advance, in accordance with an embodiment.

Timing Advance corresponds to the time it takes a signal to reach the eNB/gNB from a User Equipment. Timing Advance is generally reported between 0 to 63 with each step corresponds 3.69 microsecond. With radio wave travelling approximately 300 meter per microsec that round trip distance corresponds to 1100 meters, per TA command it corresponds to 550 meters, for TA max that is 63, the maximum distance that corresponds to 63*550 which is 35 KM, but the cell range depends on the kind of PRACH preamble format being used, currently the 5G NR support max distance of 15 KM and a min distance of 1.6 KM depending on the type of preamble format being used. FIG. 9 illustrates an exemplary timing advance.

5. QOffset

Figure 10:
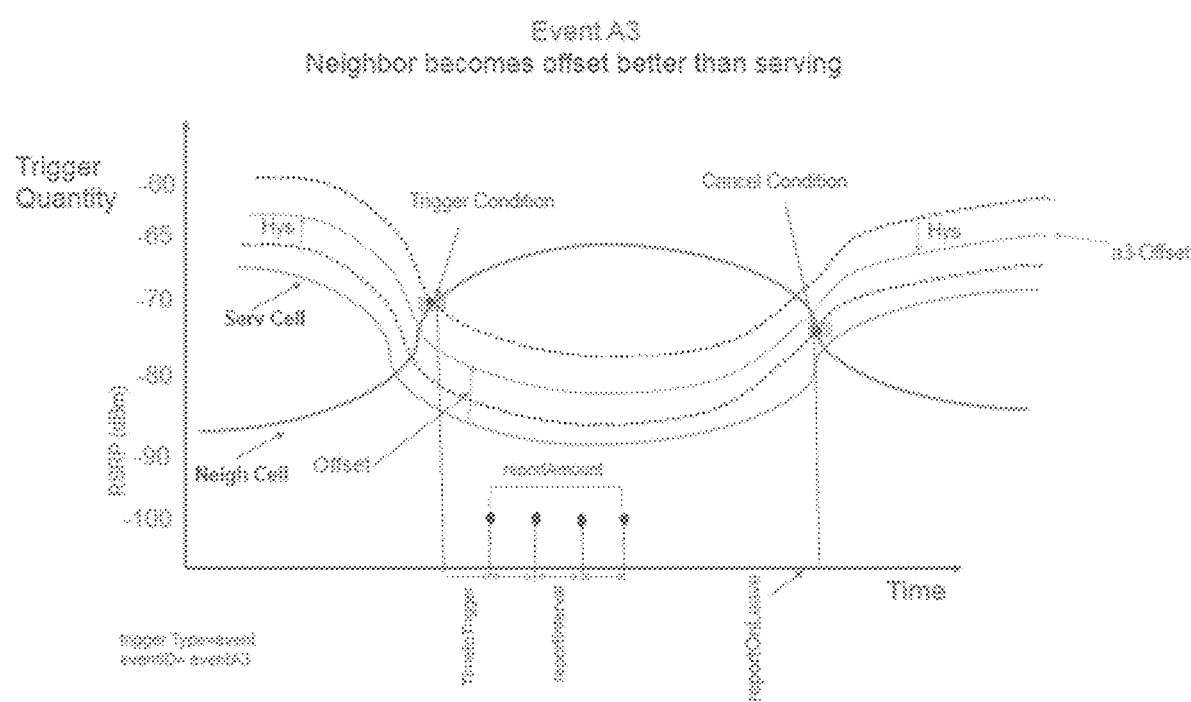
FIG. 10 illustrates use of the QOffset, in accordance with an embodiment.

If we see the criteria of NR Neg addition, it is triggered by the event B1 which is expressed in RSRP (Reference signal Received power). Applying offset and hysteresis helps avoiding ping pong effect and make sure we only Add NR leg when the received signal is sufficient enough and avoid signal fluctuation. FIG. 10 illustrates use of the QOffset.

6. System Information Block 2 (SIB2)

In 5G NR, System Information Block Type 2 or SIB2 provides information which is common to intra frequency, inter frequency and inter-system cell (NR— LTE) reselection. It also provides information which is specific to intra-frequency cell reselection. In 5G, Cell reselection can be based upon a cell level and beam level measurements. When the gNB transmits multiple beams, a UE is required to generate a cell level measurement from one or more beam level measurements.

The following is the category list for content provided by NR SIB 2 message to UE: Cell Reselection Info Common; Cell Reselection Serving Freq Info; Intra Freq Cell Reselection Info.

7. PLMN

A PLMN is identified by a globally unique PLMN code, which consists of a MCC (Mobile Country Code) and MNC (Mobile Network Code).

A PLMN is part of a: Location Area Identity (LAI) (PLMN and Location Area Code); Cell Global Identity (CGI) (LAI and Cell Identifier); IMSI (see PLMN code and IMSI).

8. RRC Connected State

The Radio Resource Control (RRC) protocol is used in UMTS and LTE on the Air interface. It is a layer that exists between UE and eNB and exists at the IP level (Layer 3/Network Layer). This protocol is specified by 3GPP in TS 25.331 for UMTS and in TS 36.331 for LTE. RRC messages are transported via the PDCP-Protocol.

The major functions of the RRC protocol include connection establishment and release functions, broadcast of system information, radio bearer establishment, reconfiguration and release, RRC connection mobility procedures, paging notification and release and outer loop power control. By means of the signaling functions the RRC configures the user and control planes according to the network status and allows for Radio Resource Management strategies to be implemented.

9. ARFCN

An Absolute Radio-Frequency Channel Number (ARFCN) is a code that specifies a pair of reference frequencies used for transmission and reception in radio system. In a FDD system one ARFCN number is required for downlink and another for uplink as downlink and uplink frequencies are different while for TDD system only one ARFCN number is enough as downlink and uplink frequency remains same.

10. PSS

Primary synchronization signals consist of one of three 62-symbol Zadoff-chu sequences in a cell. The Primary Synchronization Signal (PSS) is broadcast twice during every radio frame and both transmissions are identical. In the case of FDD: the PSS is broadcast using the central 62 subcarriers belonging to the last symbol of time slots 0 and 10 In the case of TDD: the PSS is broadcast using the central 62 subcarriers belonging to the third symbol of time slot 2 (subframe 1) and the third symbol of time slot 12 (subframe 6) PSS helps to achieve subframe, slot and symbol synchronization in the time domain, identify the center of the channel bandwidth in the frequency domain and deduce a pointer towards 1 of 3 Physical layer Cell Identities (PCI). The PSS cannot be used to achieve radio frame synchronization because both transmissions within the radio frame are identical and equally spaced in time.

11. SSS

After the primary sync signal acquisition, UE tries to detect the secondary synchronization signal. Secondary synchronization signals are one of 168 codes which are 62-bit sequences. The Secondary Synchronization Signal (SSS) is broadcast twice within every radio frame. The two transmissions of the SSS are different so the UE can detect which is the first and which is the second. In the case of FDD: the SSS is broadcast using the central 62 subcarriers belonging to the second to last symbol of time slots 0 and 10 In the case of TDD: the SSS is broadcast using the central 62 subcarriers belonging to the last symbol of time slot 1 (subframe 0) and the last symbol of time slot 11 (subframe 5) SSS helps to achieve radio frame synchronization and deduce a pointer towards 1 of 168 Physical layer Cell Identity (PCI) groups.

Figure 11:
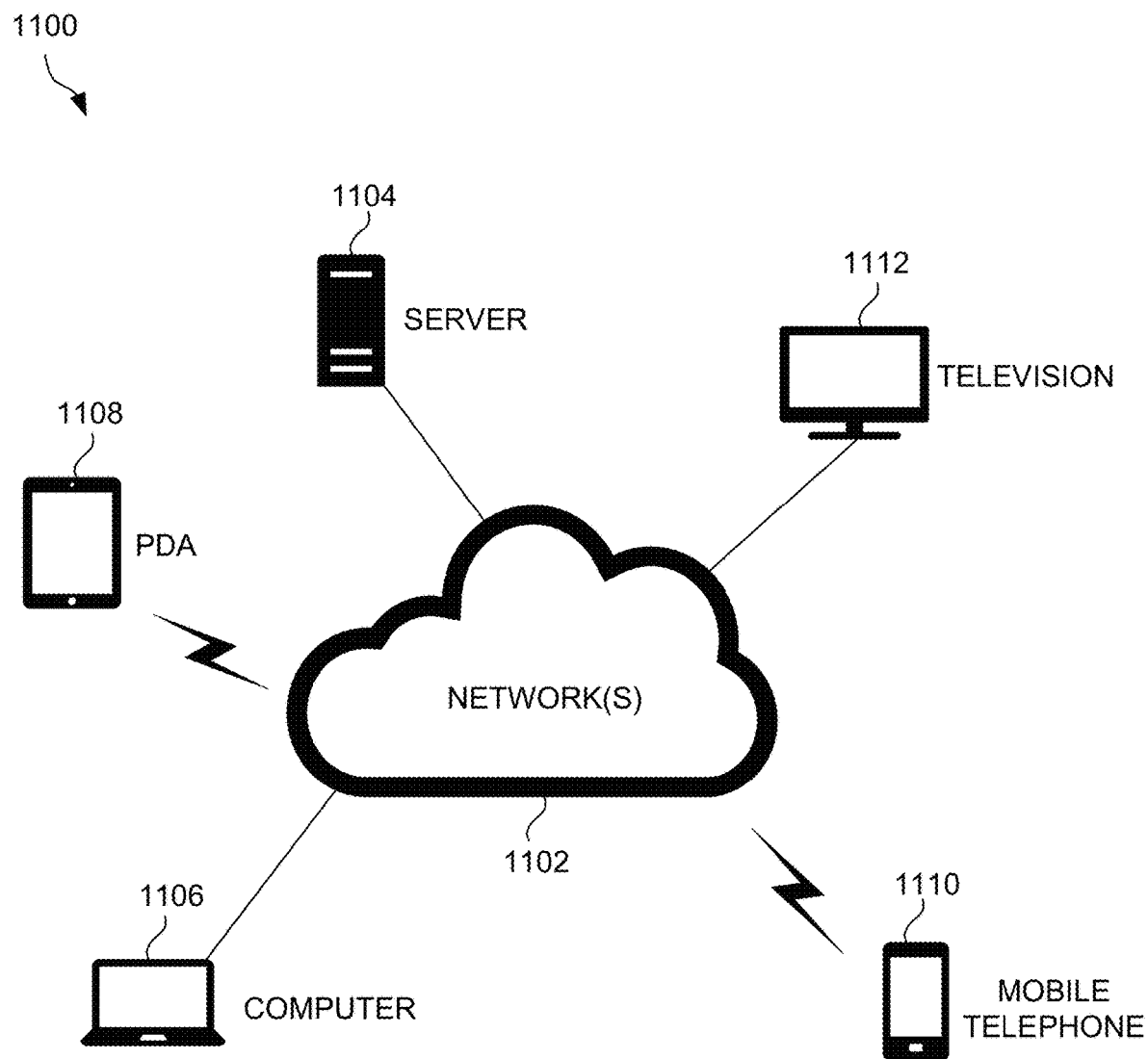
FIG. 11 illustrates a network architecture, in accordance with one possible embodiment.

FIG. 11 illustrates a network architecture 1100, in accordance with one possible embodiment. As shown, at least one network 1102 is provided. In the context of the present network architecture 1100, the network 1102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1102 may be provided.

Coupled to the network 1102 is a plurality of devices. For example, a server computer 1104 and an end user computer 1106 may be coupled to the network 1102 for communication purposes. Such end user computer 1106 may include a desktop computer, lap-top computer, and/or any other type of logic. Still yet, various other devices may be coupled to the network 1102 including a personal digital assistant (PDA) device 1108, a mobile phone device 1110, a television 1112, etc.

Figure 12:
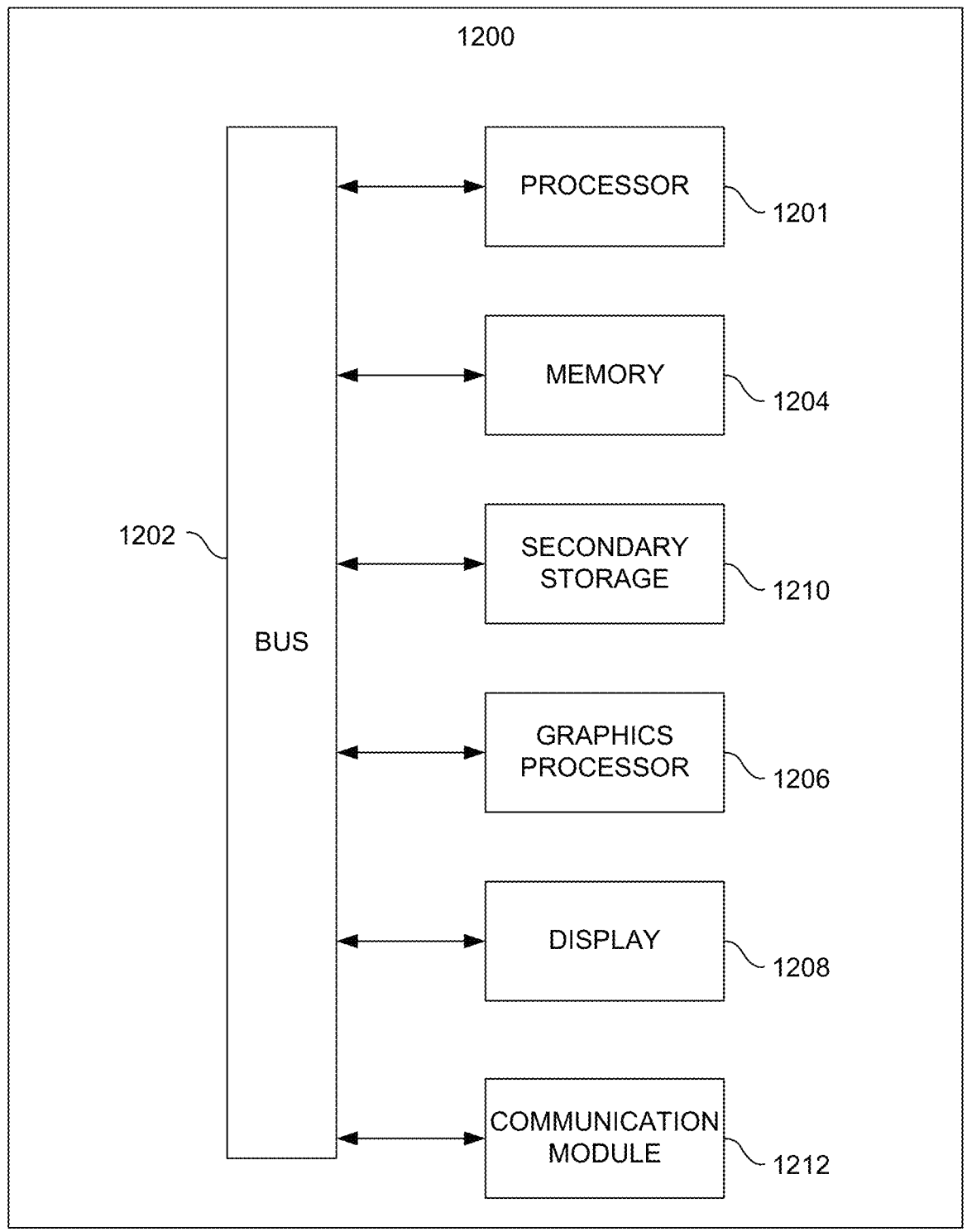
FIG. 12 illustrates an exemplary system, in accordance with one embodiment.

FIG. 12 illustrates an exemplary system 1200, in accordance with one embodiment. As an option, the system 1200 may be implemented in the context of any of the devices of the network architecture 1100 of FIG. 11. Of course, the system 1200 may be implemented in any desired environment.

As shown, a system 1200 is provided including at least one central processor 1201 which is connected to a communication bus 1202. The system 1200 also includes main memory 1204 [e.g. random access memory (RAM), etc.]. The system 1200 also includes a graphics processor 1206 and a display 1208.

The system 1200 may also include a secondary storage 1210. The secondary storage 1210 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 1204, the secondary storage 1210, and/or any other memory, for that matter. Such computer programs, when executed, enable the system 1200 to perform various functions (as set forth above, for example). Memory 1204, storage 1210 and/or any other storage are possible examples of non-transitory computer-readable media.

The system 1200 may also include one or more communication modules 1212. The communication module 1212 may be operable to facilitate communication between the system 1200 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:
   during an initial access procedure by a user equipment on a 4G leg of a 4G-LTE network, computing, by an eNodeB of the 4G-LTE network, a parameter for the user equipment, wherein the parameter includes:
   an advanced timing computed for the user equipment,
   an existing power level computed for the user equipment, and
   a cell range of the computed for the user equipment;
   determining, by the eNodeB of the 4G-LTE network, that the parameter computed for the user equipment does not hinder use of a 5G leg by the user equipment when the user equipment is still on the 4G leg, wherein it is determined that the parameter does not hinder use of the 5G leg by the user equipment when:
   the advanced timing is allowed for the 5G network,
   the existing power level will support an uplink synchronization with the 5G leg, and
   the cell range will support the uplink synchronization with the 5G leg;
   responsive to the determining that the parameter does not hinder use of the 5G leg by the user equipment, allowing, by the eNodeB of the 4G-LTE network, an addition of the 5G leg to the 4G-LTE network for the user equipment;
   wherein the 5G leg is added to the 4G-LTE network using an existing infrastructure of the 4G-LTE network, and wherein the 5G leg is one of:
   collocated within a same cell of the 4G-LTE network as the 4G leg, or
   located in a first cell of the 4G-LTE network that is separate from a second cell of the 4G-LTE network in which the 4G leg is located.

2. The non-transitory computer readable medium of claim 1, wherein the 4G leg and the 5G leg are collocated within the same cell of the 4G-LTE network.

3. The non-transitory computer readable medium of claim 1, wherein the 4G leg is located in the first cell of the 4G-LTE network and the 5G leg is located in the second cell the 4G-LTE network.

4. The non-transitory computer readable medium of claim 1, further comprising:
   causing, by the eNodeB, the user equipment to perform an initial access procedure on the 5G leg added to the 4G-LTE network.

5. The non-transitory computer readable medium of claim 1, wherein the 5G leg is added to the 4G-LTE network after the determining that the parameter computed for the user equipment does not hinder use of a 5G leg by the user equipment.

6. A method, comprising:
   during an initial access procedure by a user equipment on a 4G leg of a 4G-LTE network, computing, by an eNodeB of the 4G-LTE network, a parameter for the user equipment, wherein the parameter includes:
   an advanced timing computed for the user equipment,
   an existing power level computed for the user equipment, and
   a cell range of the computed for the user equipment;
   determining, by the eNodeB of the 4G-LTE network, that the parameter computed for the user equipment does not hinder use of a 5G leg by the user equipment when the user equipment is still on the 4G leg, wherein it is determined that the parameter does not hinder use of the 5G leg by the user equipment when:

the advanced timing is allowed for the 5G network, the existing power level will support an uplink synchronization with the 5G leg, and the cell range will support the uplink synchronization with the 5G leg;

responsive to the determining that the parameter does not hinder use of the 5G leg by the user equipment, allowing, by the eNodeB of the 4G-LTE network, an addition of the 5G leg to the 4G-LTE network for the user equipment;

wherein the 5G leg is added to the 4G-LTE network using an existing infrastructure of the 4G-LTE network, and wherein the 5G leg is one of:

collocated within a same cell of the 4G-LTE network as the 4G leg, or located in a first cell of the 4G-LTE network that is separate from a second cell of the 4G-LTE network in which the 4G leg is located.

\* \* \* \* \*